United States Patent
Høj

(10) Patent No.: US 6,697,714 B1
(45) Date of Patent: Feb. 24, 2004

(54) DEVICE FOR DISPLAYING THE TIME OF PARKING OF A VEHICLE

(75) Inventor: Maryan Høj, Frederiksberg (DK)

(73) Assignee: Cartime Aps, Frederiksberg (DK)

( * ) Notice: Subject to any disclaimer, the term of this patent is extended or adjusted under 35 U.S.C. 154(b) by 0 days.

(21) Appl. No.: 10/009,025

(22) PCT Filed: Jun. 7, 2000

(86) PCT No.: PCT/DK00/00306

§ 371 (c)(1),
(2), (4) Date: Dec. 6, 2001

(87) PCT Pub. No.: WO00/75878

PCT Pub. Date: Dec. 14, 2000

(30) Foreign Application Priority Data

Jun. 8, 1999 (DK) .......................... 1999 00808

(51) Int. Cl.⁷ ................................ B60Q 1/48
(52) U.S. Cl. ........................ 701/1; 340/932.2
(58) Field of Search ............ 701/1, 36, 213, 701/200; 340/932.2, 938

(56) References Cited

U.S. PATENT DOCUMENTS 4,310,890 A * 1/1982 Trehn et al. .................... 701/1
5,266,947 A * 11/1993 Fujiwara et al. ......... 340/932.2

FOREIGN PATENT DOCUMENTS

| DE | 36 18 997 | 12/1987 |
|---|---|---|
| DE | 91 07 802 | 8/1991 |
| DE | 40 13 719 | 10/1991 |
| DE | 295 11 185 | 10/1995 |
| DE | 296 07 726 | 8/1996 |
| DE | 196 26 948 | 1/1997 |
| DE | 196 21 424 | 12/1997 |
| DE | 198 29 602 | 1/2000 |
| DE | 199 48 178 | 10/2001 |
| EP | 0 959 435 | 11/1999 |
| EP | 1 221 676 | 7/2002 |
| WO | WO 94/16396 | 7/1994 |
| WO | WO 94/28517 | 12/1994 |
| WO | WO 99/34338 | 7/1999 |

* cited by examiner

Primary Examiner—Richard M. Camby
(74) Attorney, Agent, or Firm—Merchant & Gould P.C.

(57) ABSTRACT

The present invention relates to a device for displaying the time of parking of a vehicle by placing the device on the front screen of the vehicle, said device comprising display means which receives a timer signal from a time signal generation means via control means, said control means being connected to the ignition system of the vehicle in such a way that an update of the time display is frozen once the ignition of the vehicle is turned off, said control means being adapted to receiving the time signal from an external signal generation means. By a device according to the present invention, the displayed time in the vehicle containing the device when parked is reliable as far as the time of parking is concerned since the time signal is received from an external source and can therefore not be manipulated before being displayed.

12 Claims, 1 Drawing Sheet

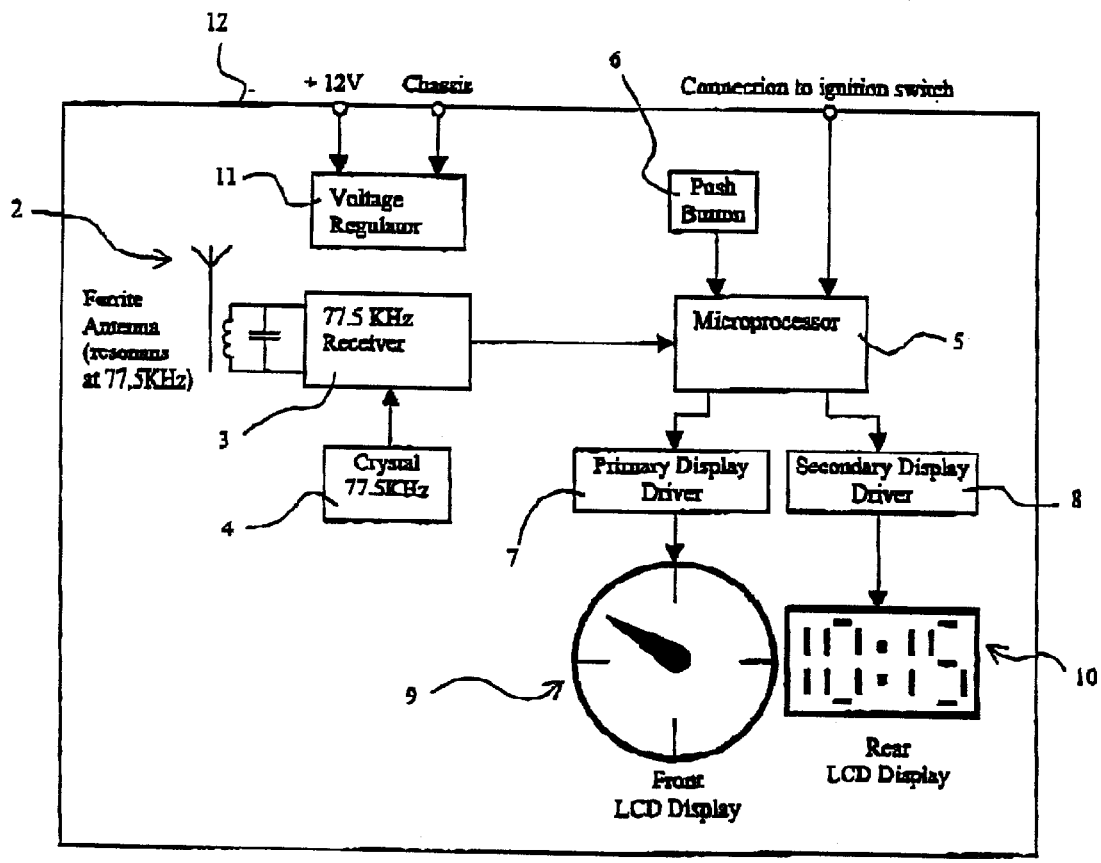
*Fig. 1*
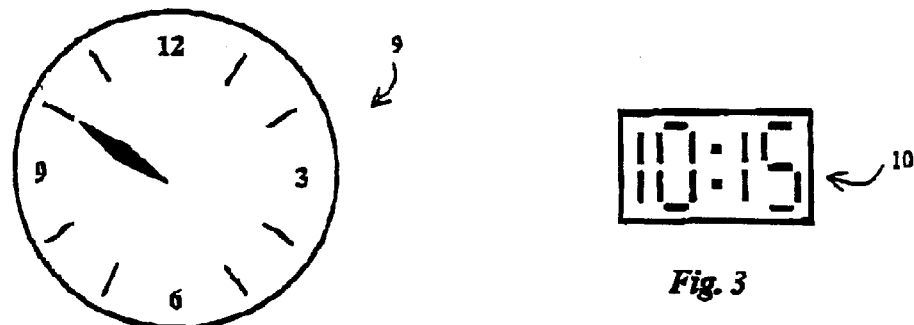
*Fig. 2*
*Fig. 3*

DEVICE FOR DISPLAYING THE TIME OF PARKING OF A VEHICLE

The present invention relates to a device for displaying the time of parking of a vehicle by placing the device on the screen of the vehicle.

Especially in some urban areas with parking regulations, the drive of a vehicle is obliged to use a parking discs to display the time of parking when parking the vehicle in parking areas with a parking time limit. For this purpose, parking discs are used. The parking disc is usually placed in the upper or lower corner the front screen in such a way that it is clearly visible from the outside. The parking disc comprises a dial with the face of a clock and a hand that is manually set by the driver of the vehicle at the time of parking.

It has been known to happen that a driver forgets to set the parking disc which may result in a parking fine to the driver or owner of the vehicle. In order to overcome this risk, various ideas have been exercised in order to provide an automatic system for setting the parking time of the vehicle. The automatic time displaying device typically comprises display means which receives a timer signal from time signal generation means via control means, said control means being connected to the ignition system of the vehicle in such a way that the update of the time display is frozen once the ignition of the vehicle is turned off.

However, these automatic systems involve some serious drawbacks and have not been allowed by traffic and/or parking authorities so far. A problem with the known devices for automatically displaying the time of parking is that the systems are not tamper proof. In order to allow parking displaying devices, the authorities must have a guarantee that the displayed time reflects the actual time of parking.

It is the object of the present invention to provide a device for displaying the parking time of a vehicle which cannot be tampered with by the driver, thus ensuring that the parking time displayed reflects the actual time of parking.

This object is achieved by a device for displaying the time of parking of a vehicle by placing the device on the screen of the vehicle, said device comprising display means which receives a timer signal from a time signal generation means via control means, said control means being connected to the ignition system of the vehicle to such a way that the update of the time display is frozen once the ignition of the vehicle is turned off, and in such a way that the control means are adapted to receiving the time signal from an external signal generation means.

By a device according to the present invention, the displayed time at which the vehicle containing the device is parked is reliable as far as the time of parking is concerned since the time signal is received from an external source and can therefore not be manipulated before being displayed. By using an external time signal representing the actual present time, a device according to the invention is automatically adjusted in accordance with the actual time zone which the vehicle is in, i.e. change between summer and winter time is automatically adjusted. Moreover, the device may also be adapted to receiving position related data, so that an adjustment of the displayed time may automatically be made if the vehicle enters a new time zone. A device according to the invention thus provides as a fully automatic device for displaying the time of parking whereby the risk of forgetting to the set parking time is eliminated.

As long as the ignition is on and the engine is running, the externally generated time signal updates the display via the control means so that the time shown on the display reflects the present time in hours and minutes. Once the ignition is turned off, the time on the display will be "frozen", so that the time displayed reflects the time when the ignition was turned off. This time corresponds to the time of parking of the vehicle.

The external time signal source could preferably be a radio signal transmitted from a radio or satellite transmitter, such as the known central time signal generators transmitting the time signal generated by an atomic clock to various other time displaying means, e.g. watches, etc. Other time signal sources could be satellites used for GPS navigation. The time signals as well as the position data from such sources cannot be manipulated due to the nature of the signal generation.

Preferably, the control means comprises an antenna for receiving an external time signal which feeds the received signal to a receiver provided with one or more crystals, and a microprocessor that receives a digitized signal from the receiver and updates the display means in accordance with collected data of the ignition state and the execution of an operation program. The antenna, the receiver and the crystals are designed in accordance with the specific time signal to be received. The control means may be compact in design so that the device may be hidden behind a panel or the like in a vehicle.

The microprocessor may also include a memory for storing the time for updating the display means at a pre-determined time interval as long as the ignition of the vehicle is on and then updating the display again after the ignition has been turned off. Hereby, the device may be fully automatic so that the device is immediately ready again after having been in a parked state. The pre-determined time interval is initially set in accordance with regulative requirements, such as 15 minutes.

A manually operated switch may be provided in connection with the microprocessor in order to allow for adjustment of the time of parking manually. Hereby, the device may be manually operated e.g. if the vehicle is parked in between two updates or if the device is not capable of receiving a time signal, e.g. if the external source is out of order.

In the preferred embodiment, the display means comprises an LCD display with a translucent or transparent background. Hereby, the device blends in with the surroundings and does only block a minor part of the front screen visually.

The display means preferably comprises both an outwardly and an inwardly facing display making it easy to check if the display is correctly set when the car is parked.

In a preferred embodiment, at least one display, preferably the outwardly facing display, is a clock dial. This design involves graphic representation of time and makes it easy for a parking officer to visually check the time of arrival in the parking slot.

The inwardly facing display may preferably be an LCD display with four digits separated in pairs of two. This type of display facilitates checking of the time from inside the car and makes it easy to determine if an adjustment of the "frozen" time in the display is required before vacating the car.

As an additional aspect of the above-mentioned embodiments, the device may also receive a data signal representing the position of the vehicle, and may be provided with data transmitting means for collecting arrival and departure time data when entering and leaving a geographically defined zone and subsequently transmitting said data to a central recording unit. In this embodiment, a device according to the invention may record and display the time of arrival in the parking slot while also recording the duration of the parking and/or time of presence in a particular location. Thus, it becomes possible to make automatic recordings of the time of presence within e.g. a geographically defined zone, such as an urban area, in which a system of road pricing is in force. Moreover, via the central recording unit, automatic debiting of the road pricing and/or parking fees from the drivers or vehicle owner's bank account may be performed.

In the following, the invention is described in detail with reference to a preferred embodiment and to the accompanying figures, in which FIG. 1 shows a block diagram of the electrical implementation of a device according to a preferred embodiment of the invention, and FIGS. 2 and 3 are schematic illustrations of LCD displays in the device.

The block diagram in FIG. 1 shows an electrical implementation of a device according to the invention.

The device comprises a ferrite antenna 2 connected to a receiver 3 for receiving a time signal. The receiver 3 forwards the time signal to a microprocessor 5 that controls the display drivers 7, 8 connected to displays 9, 10 in accordance with control data from the peripheral connections 12.

Ferrite Antenna

The antenna 2 consists of a ferrite rod, a coil and a capacitor. The rod is approx. 6 cm long and the diameter is approx. 8 mm. The coil is wound around the rod and the capacitor is mounted across the coil (connected in parallel). The value of the coil and the capacitor must be selected to provide a resonant frequency of 77.5 KHz with a resonant resistance of 50 Kohm to 200 Kohm. A high Q-value is preferable in order to improve reception in noisy areas. However, a very high Q-value may cause a variation in the resonant frequency with temperature.

77.5 KHz Receiver

The receiver 3 is a standard chip implementing a straight-through receiver circuit in the frequency range of 40 KHz to 80 KHz. This chip is designed for radio-controlled clock application. The input for the receiver 3 is an amplitude modulated carrier-frequency. The modulation contains digitally coded information of the precise time, date and year. The output from the chip is a digitized serial signal containing raw information from the modulation. This signal is transferred to the microprocessor 5 for further processing.

The characteristics of the standard receiver chip are:

Very low power consumption

Very high sensitivity

High selectivity

Power-down mode

Digitized serial output signal

AGC hold mode

Crystal 77.5 KHz

The standard receiver chip requires two crystals 4. However, if full sensitivity and selectivity are not required, one of these crystals may be substituted for a capacitor. The specification for the crystals 4 is:

| Frequency: | 77.5 KHz |
|---|---|
| Freq. Tol.: | 20 ppm |
| Freq. stability over temp. | 0.034 ppm |

-continued

| Operating temp | −20° C. to 70° C. |
|---|---|
| Equivalent Series Resistance | 50 Kohm |
| Load Capacitance | 12.5 pF |

Voltage Regulator

This circuit consists of a standard series regulator 11. The input for the series regulator 11 is the battery voltage from the car. The output from the series regulator 11 is 3.3 Volt which is the supply voltage for all electrical circuits. The requirements to the voltage regulator 11 are:

| Minimum Input Voltage: | 7 Volt |
|---|---|
| Maximum Input Voltage | 15 Volt |
| Output Voltage: | 3.3 Volt +/− 10% |
| Maximum Load Current: | 50 mA. |

Microprocessor

The microprocessor 5 is a low-cost 8 bit microcontroller. The MC68HC908 is selected. It includes 1.5K Flash, 128 bytes of flash, 2×16 timers, 15 general I/O pins and on board flash programming.

It will interface to the 77.5 KHz receiver, 2 wire (interface)

to the primary display driver, 3 wire (interface)

to the secondary display driver, 3 wire (interface)

to the ignition switch, 1 wire to the push button switch, 1 wire to a flash/debug interface, 3 wire (interface)

The application running on this processor 5 will then concurrently sample the time by readings from the receiver 3, and the recorded time will be written in primary and secondary displays 7, 8. By supervising the ignition state, and when in ignited state updating time on the displays 9, 10, a transition to non-ignited state will stop the display update. If the push button is activated in this state, the program must adjust the displays forward by 15 minutes for each activation. When the ignition is turned on again, the current time will be outputted on the displays 9, 10.

If/when the power supply has been off or if the radio connection (to DFC77 transmitter) is lost, a frame synchronisation protocol to the DCF77 transmitter must follow. Otherwise, the time at any state will be stored in the memory.

Primary Display Driver

The primary display driver 7 is represented by a standard LCD driver. It controls 2 backplane segments and 24 multiplexed segment inputs. Through a 3 wire serial interface, it will be controlled by the processor. Included in this circuit is a temperature compensating passive component network in order to stabilise display contrast over temperature.

Secondary Display Driver

The second display driver 8 is represented by a standard LCD driver. It controls 1 backplane segments and 29 segment inputs. Through a 3 wire serial interface, it will be controlled by the processor. Included in this circuit is a temperature compensating passive component network in order to stabilise display contrast over temperature.

Front (Primary) LCD Display

The first display 9 is shown in FIG. 2. It is a 48 segment custom-made LCD display with a circular watch vision with 10 cm of visible area. This display constitutes the part of the display means of the time recording device which is visible from the outside of the vehicle.

The time "cursor" is an addressable segment on the display. Forty eight of these arrows are in fact available in the display LCD structure, thus providing a 15 minutes resolution. For that reason, they are placed in a circle whose origin is at the centre of the display. Hour digits/dashes are printed on the glass.

The display 9 is multiplexed 1:2, i.e. with 2 backplane segments and 24 segment inputs. It is driven by the Primary display driver. The connection from the display to the PCB (Printed circuit board) will be provided by elastomeric connectors connecting terminals on the LCD glass to PCB gold plated terminals.

Rear (Secondary) LCD Display

This second display 10 is shown in FIG. 3. It is a 29 segment standard LCD display. Four 7 segment digits divided in pairs of two and separated by semicolons will show hours and minutes. The 2 first digits will show hours.

This display 10 is visible from the inside of the vehicle and is only used to control the primary display when manual setting of the primary display (by activating push button) is required. The 29 digits are addressable through areas in the LCD structure. The display is non-multiplexed, i.e. it has one backplane and the 29 segments must be driven statically. It is driven by the Secondary display driver. The connection from the display to the PCB will be provided be elastomeric connectors connecting terminals on the LCD glass to the PCB gold plated terminals.

Push Button

In the preferred embodiment, the device is provided with a push-button 6. Once this button is activated, the time indicator on both displays advances 15 minutes. To repeat this, the button 6 must be released and then pushed again. With this function, the time of arrival can be set manually.

Peripheral Connections

A small standard RJ-11 connector is implemented. This connector provides easy connection and disconnection between the device and the required peripheral wiring 12. The wiring must be turned off with an RJ11-plug.

The wiring requires the following three peripheral connections 12:

12 Volt from the car battery

Chassis

Ignition Switch

The input from the ignition switch is protected against electrical transients. The input tolerates signals up to 15 Volts. The minimum voltage for detection of the ignition switch is 2.4 Volt.

The device is capable of operating at temperatures ranging from −20° C. to 70° C. and may be stored at storage temperature ranging from −30° C. to 85° C.

It is realised by the present invention that other components and implementive solutions than the above-mentioned may be used without departing from the scope of the invention as defined by the accompanying claims.

What is claimed is:

1. A device for displaying the time of parking of a vehicle by placing the device on the screen of the vehicle, said device comprising
   display means which receives a timer signal from a time signal generation means via control means, the display means comprising an outwardly and an inwardly facing display,
   said control means being connected to the ignition system of the vehicle in such a way that an update of the time display is frozen once the ignition of the vehicle is turned off,
   wherein the control means being adapted to receiving the time signal from an external signal generation means.

2. A device according to claim 1, wherein the time signal is received from at least one satellite.

3. A device according to claim 2, wherein the at least one satellite, from which the time signal is received, is also usable in a global positioning system (GPS) for providing positioning data of the vehicle.

4. A device according to claim 1, wherein the time signal is received via a radio transmitter.

5. A device according to claim 1, wherein the control means comprises an antenna for receiving an external time signal which feeds the received signal to a receiver provided with one or more crystals, and a microprocessor which receives a digitized time signal from the receiver and updates the display means of the ignition state in accordance with collected data.

6. A device according to claim 5, wherein the microprocessor includes a memory for storing the time for updating the display means at a pre-determined time interval as long as the ignition of the vehicle is on and subsequently updates the display after the ignition has been turned off and then turned back on again.

7. A device according to claim 5, wherein a manually operated switch is interfaced with the microprocessor in order to allow setting of the time of parking manually.

8. A device according to claim 1, wherein the display means comprises an LCD display with a translucent or transparent background.

9. A device according to claim 1, wherein at least one display, preferably the outwardly facing display, is a clock dial.

10. A device according to claim 1, wherein the inwardly facing display is an LCD display with four digits separated in pairs of two.

11. A device according to claim 1, wherein a data signal representing the position of the vehicle is received, and wherein the data transmitting means are provided for collecting arrival and departure time data when entering and leaving a geographically defined zone which transmits said data to a central recording unit.

12. A device according to claim 11, wherein the data transmitted by the data transmitting means additionally or alternatively comprises information, such as an SMS message, to a dedicated mobile communication device about the vehicle in order for the user of said communication device to monitor the duration of the parking time of the vehicle.

* * * * *